(12) United States Patent
Jung et al.

(10) Patent No.: US 10,663,187 B2
(45) Date of Patent: May 26, 2020

(54) AIR CONDITIONING SYSTEM AND CONTROL METHOD THEREOF

(71) Applicant: LG ELECTRONICS INC., Seoul (KR)

(72) Inventors: Seunghwan Jung, Seoul (KR); Juntae Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 50 days.

(21) Appl. No.: 15/945,586

(22) Filed: Apr. 4, 2018

(65) Prior Publication Data

US 2018/0283722 A1 Oct. 4, 2018

(30) Foreign Application Priority Data

Apr. 4, 2017 (KR) .................. 10-2017-0043858

(51) Int. Cl.
*F24F 11/58* (2018.01)
*G05B 15/02* (2006.01)
*F24F 11/38* (2018.01)

(52) U.S. Cl.
CPC .............. *F24F 11/58* (2018.01); *F24F 11/38* (2018.01); *G05B 15/02* (2013.01); *G05B 2219/2642* (2013.01)

(58) Field of Classification Search
None
See application file for complete search history.

(56) References Cited

U.S. PATENT DOCUMENTS

| | | | |
|---|---|---|---|
| 2002/0016656 A1 | 2/2002 | Chung et al. | |
| 2002/0173929 A1* | 11/2002 | Seigel | F24F 11/30 702/130 |
| 2009/0241577 A1* | 10/2009 | Fukushima | F25B 13/00 62/259.1 |
| 2011/0120162 A1 | 5/2011 | Ueda et al. | |
| 2011/0283718 A1* | 11/2011 | Ueda | F25B 1/053 62/79 |
| 2012/0245968 A1 | 9/2012 | Beaulieu et al. | |
| 2015/0334878 A1* | 11/2015 | Long | H05K 7/20781 361/679.49 |
| 2017/0045252 A1* | 2/2017 | Federspiel | G06Q 10/06 |
| 2017/0276571 A1* | 9/2017 | Vitullo | G05B 23/0248 |

FOREIGN PATENT DOCUMENTS

| | | |
|---|---|---|
| JP | 2013-170753 A | 9/2013 |
| JP | 2015-203544 A | 11/2015 |
| KR | 10-2015-0118277 A | 10/2015 |

* cited by examiner

*Primary Examiner* — Kenneth M Lo
*Assistant Examiner* — Istiaque Ahmed
(74) *Attorney, Agent, or Firm* — Birch, Stewart, Kolasch & Birch, LLP

(57) ABSTRACT

An air conditioning system including a management server for analyzing data being received from at least one air conditioner at a predetermined time interval and for diagnosing a state of the air conditioner is provided. The condition of the air conditioner is diagnosed in real time through the analyzing of the data on the air conditioner. Performance deterioration on the air conditioner corresponding to variations over a certain period is diagnosed with data calculated or accumulated on a performance and an efficiency based on the data relating to the air conditioner.

17 Claims, 8 Drawing Sheets

(a) (b) (c)

AIR CONDITIONING SYSTEM AND CONTROL METHOD THEREOF

CROSS-REFERENCE TO RELATED APPLICATION

This application claims the priority benefit of Korean Patent Application No. 10-2017-0043858, filed on Apr. 4, 2017 in the Korean Intellectual Property Office, the entire disclosure of which is incorporated herein by reference.

BACKGROUND OF THE INVENTION

1. Field of the Invention

The present invention relates to an air conditioning system and a control method thereof and, more particularly, to an air conditioning system and a control method for diagnosing an air conditioner through the analysis of data on operations of the air conditioner.

2. Description of the Related Art

An air conditioner is a device for adjusting an indoor temperature and purifying air in a room by discharging cold air into the room and thus providing a pleasant indoor environment to humans. Generally, the air conditioner includes an indoor unit which is composed of a heat exchanger and installed in a room and an outdoor unit which is composed of a compressor, a heat exchanger, and the like, and supplies a refrigerant to the indoor unit.

The air conditioner is operated by the indoor unit composed of the heat exchanger and the outdoor unit composed of the compressor, the heat exchanger, and the like, which is separately located from the indoor unit. The outdoor unit and indoor unit are connected to each other through a refrigerant pipe, and as a result, a refrigerant compressed by the compressor of the outdoor unit is supplied to the heat exchanger of the indoor unit through the refrigerant pipe, and the refrigerant exchanged heat with air in the heat exchanger of the indoor unit flows back into the compressor of the outdoor unit through the refrigerant pipe. Thus, the indoor unit cause air to exchange heat with the refrigerant and provide cold air into the room.

In a state where the air conditioners are interconnected on a per small group or a per building basis, the air conditioners positioned within the small group or the building can exchange data with a unit or entity for managing them. As a result, an operating condition thereof based on the transmitted and received data has been monitored and any problem with the air conditioner has been diagnosed.

Korean Patent Application No. 2014-0043800 discloses that a remote management server determines whether an anomalous operating condition has occurred and transmits information on the anomalous operating condition to a service center.

However, the above-mentioned disclosure just helps an air conditioner with a malfunction that already occurred to be repaired by informing the service center of the air conditioner malfunction, and still has a limit to build data on various problems of the air conditioner.

In addition, a malfunction that only already occurred at the time of diagnosis can be diagnosed based on data from the air conditioner, but there is still a problem that any malfunction corresponding a change of the state of the air conditioner cannot be predicted.

SUMMARY OF THE INVENTION

It is an object of the present disclosure to provide an air conditioning system and a control method thereof and, more particularly, to provide an air conditioning system and a control method for diagnosing any problem with an air conditioner through the analysis of data from the air conditioner.

In accordance with one aspect of the present disclosure, an air conditioning system comprising: at least one air conditioner; a management server configured to receive data from the at least one air conditioner at a predetermined time interval and to diagnose a state of the air conditioner by analyzing the received data; and a database configured to collect data from the air conditioner. When the data from the air conditioner is received, the management server is configured to cause the data to be stored in a memory, calculate data on the performance and efficiency thereof based on the received data, and diagnose any problem of the air conditioner, such as performance deterioration, by monitoring a change of a state of the air conditioner over a predetermined period.

In accordance with an embodiment of the present disclosure, the management server includes a communication unit receiving data from the air conditioner, a main control unit configured to cause the received data to be stored in the memory and a diagnosing unit configured to determine whether the data correspond to a normal operating state, anomalous operating state, or malfunction state by analyzing the received data, calculate data on the performance and efficiency thereof based on the analyzed data, and diagnose any problem of the air conditioner, such as performance deterioration.

In accordance with an embodiment of the present disclosure, the diagnostic unit is configured to calculate a refrigerator performance coefficient and a heat balance on the air conditioner, and determine any problem of the air conditioner, such as performance deterioration.

In accordance with an embodiment of the present disclosure, the diagnostic unit is configured to set a first reference value corresponding to a certain ratio based on the rating data of the refrigerator performance coefficient, and when the refrigerator performance coefficient is less than the first reference value, determine that the performance of the air conditioner is deteriorated.

In accordance with an embodiment of the present disclosure, in a case where it is determined that the performance of the air conditioner is deteriorated, based on the refrigerator performance coefficient, the diagnostic unit is configured to determine that the performance deterioration is resulted from at least one of a quantity of cold water, freezing capacity, and tubing of cold water.

In accordance with an embodiment of the present disclosure, in a case where it is determined that the cold water quantity is in an anomalous state, the diagnostic unit is configured to derive a countermeasure for causing the performance of a pump for supplying cold water and the number of pumps being operated to be inspected.

In accordance with an embodiment of the present disclosure, in a case where it is determined that the freezing capacity is in an anomalous state, the diagnostic unit is configured to derive a countermeasure for causing a setting for an outlet temperature of cold water to be adjusted.

In accordance with an embodiment of the present disclosure, in a case where it is determined that the freezing capacity and the quantity of cold water are in a normal state, the diagnostic unit is configured to derive a countermeasure for causing the tubing of cold water to be inspected.

In accordance with an embodiment of the present disclosure, the diagnostic unit is configured to set a second reference value to determine whether or not the heat balance is in a normal state, and when a heat balance value is more than or equals to the second reference value, and determine that the air conditioner is in an anomalous state.

In accordance with an embodiment of the present disclosure, the diagnostic unit is configured to accumulate heat balance values for a certain period, and in a state where the heat balance values are more than or equal to the second reference value, if the heat balance values steadily increase, determine that the performance of the air conditioner is deteriorated.

In accordance with an embodiment of the present disclosure, in response to the performance deterioration of the air conditioner based on the heat balance, the diagnostic unit is configured to determine that the performance deterioration is resulted from at least one of cooling water, a cooling tower and a condenser.

In accordance with an embodiment of the present disclosure, in a case where it is determined that the cooling water is in an anomalous state, the diagnostic unit is configured to derive a countermeasure for causing the tubing of cold water to be inspected.

In accordance with an embodiment of the present disclosure, in a case where it is determined that the cooling tower is in an anomalous state, the diagnostic unit is configured to derive a countermeasure for causing the cooling tower to be changed.

In accordance with an embodiment of the present disclosure, in a case where it is determined that the cooling water and the cooling tower are in a normal state, the diagnostic unit is configured to derive a countermeasure for causing the condenser to be inspected.

In accordance with another aspect of the present disclosure, a control method of an air conditioning system comprises: receiving data on the air conditioner from at least one air conditioner; calculating data on the performance and efficiency thereof based on the received data; accumulating the data on the performance and efficiency and storing the accumulated data in a memory; diagnosing performance deterioration of the air conditioner by analyzing a variation of the data on the performance and efficiency; and generating a diagnostic result on the performance deterioration of the air conditioner.

In accordance with an embodiment of the present disclosure, the control method further comprises calculating a refrigerator performance coefficient and a heat balance as the data on the performance and the efficiency, by analyzing the data on the air conditioner, such as the data received from the air conditioner or the accumulated data.

In accordance with an embodiment of the present disclosure, the control method further comprises setting a first reference value corresponding to a certain ratio based on the rating data of the refrigerator performance coefficient, and when the refrigerator performance coefficient is less than the first reference value, determining that the performance of the air conditioner is deteriorated.

In accordance with an embodiment of the present disclosure, in a case where it is determined that the performance of the air conditioner is deteriorated, based on the refrigerator performance coefficient, the control method further comprises determining that the performance deterioration is resulted from at least one of a quantity of cold water, freezing capacity, and the tubing of cold water.

In accordance with an embodiment of the present disclosure, the control method further comprises, in a case where it is determined that the quantity of cold water is in an anomalous state, deriving a countermeasure for causing the performance of a pump for supplying cold water and the number of pumps being operated to be inspected, in a case where it is determined that the freezing capacity is in an anomalous state, deriving a countermeasure for causing a setting for an outlet temperature of cold water to be adjusted, and in a case where it is determined that the quantity of cold water and the freezing capacity are in a normal state, deriving a countermeasure for causing the tubing of cold water to be inspected.

In accordance with an embodiment of the present disclosure, the control method further comprises setting a second reference value to determine whether or not the heat balance is in a normal state, and when a heat balance value is more than or equals to the second reference value, determining that the air conditioner is in an anomalous state.

In accordance with an embodiment of the present disclosure, in a state where heat balance values are more than or equal to the second reference value for a certain period, if the heat balance values steadily increase, the control method further comprises determining that the performance of the air conditioner is deteriorated.

In accordance with an embodiment of the present disclosure, in response to the performance deterioration of the air conditioner based on the heat balance, the control method further comprises determining that the performance deterioration is resulted from at least one of cooling water, a cooling tower and a condenser.

In accordance with an embodiment of the present disclosure, the control method further comprises, in a case where it is determined that the cooling water is in an anomalous state, deriving a countermeasure for causing the tubing of cooling water to be inspected, in a case where it is determined that the cooling tower is in an anomalous state, deriving a countermeasure for causing the cooling tower to be changed, and in a case where it is determined that the cooling water and the cooling tower are in a normal state, deriving a countermeasure for causing a setting of the condenser to be inspected.

In accordance with the embodiments of the present disclosure, data on air conditioner from a plurality of air conditioners are received, and an operation condition of the air condition is monitored or diagnosed in real time based on the received data. Moreover, data on the performance and efficiency thereof are calculated based on the data on the air conditioner, and as a result, any problem with the air conditioner is monitored or diagnosed based on a variation of the data on the performance and efficiency. In addition, according to the present disclosure, the performance and efficiency of the air conditioner over a long period of time, as well as a temporary-occurring problem, can be diagnosed based on accumulated data on the performance and efficiency of the air conditioner and variations in energy usage. According to the present disclosure, data from a plurality of air conditioners can be received and analyzed in real time and thus an operation state of the air conditioner is diagnosed in real time. Therefore, it is possible to cope immediately with any problem of the air conditioner, also determine the performance and efficiency of the air conditioner corresponding to variations over a period of time, and thus prevent damage to the air conditioner, improve the efficiency of the operation of the air conditioner, and maintain performance thereof over a certain level by inspection and repair.

DETAILED DESCRIPTION OF THE PREFERRED EMBODIMENTS

Advantages, features and demonstration methods of the present disclosure will be clarified through various embodiments described in more detail below with reference to the accompanying drawings. The disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Further, the present invention is only defined by scopes of claims. Wherever possible, the same reference numbers will be used throughout the specification to refer to the same or like parts. Furthermore, a controller and each unit of an air conditioner may be implemented with one or more processors, and/or hardware devices.

Figure 1:
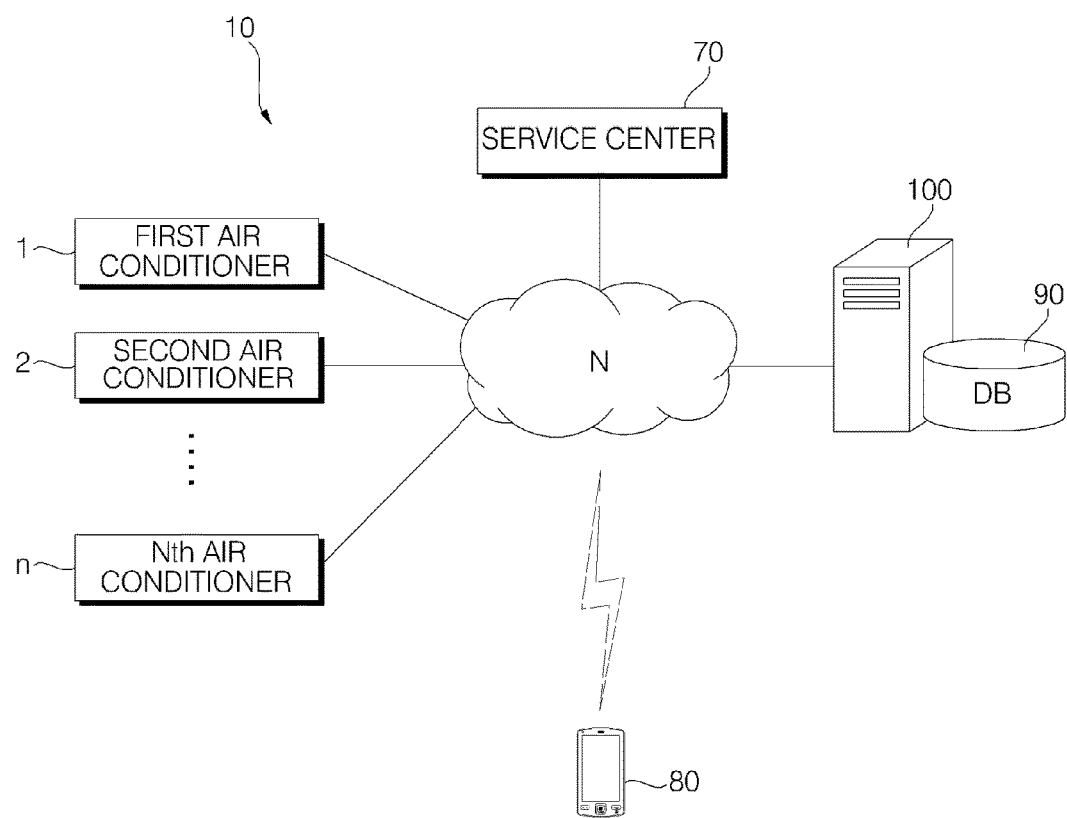
FIG. 1 is a view illustrating a configuration of an air conditioning system according to an embodiment of the present disclosure.

FIG. 1 is a view illustrating a configuration of an air conditioning system according to an embodiment of the present disclosure.

As illustrated in FIG. 1, an air conditioning system includes at least one air conditioner, a service center 70, a management server 100, a database 90, and a terminal 80.

The air conditioning system may include a plurality of air conditioners 1 to n which may be located in different locations, and the plurality of air conditioners 1 to n are connected to the management server 100 through a network N.

The service center 70 may provide customer support, repair and inspection service for the air conditioners. The service center 70 may receive user complaints via the Internet or communication network, remotely perform consultations, and respond to requests for repair of air conditioners and dispatch service personnel to locations where air conditioners are installed.

The service center 70 is connected to the management server 100, and if a diagnosis result of the management server indicates that the malfunction has occurred, may set a repair reservation for the air conditioner and then dispatch a service engineer.

The terminal 80 is connected to the air conditioner through the communication network N and monitor an operation state of the air conditioner, and control an operation of the air conditioner or air conditioning system. In addition, the terminal 80 may access the service center 70 through the network to request a service. The terminal 80 equips with a communication module, accesses to the network and has an application for air conditioner control. The terminal 80 may be computers, laptops, smart phones, PDAs or tablet PCs.

Figure 5:
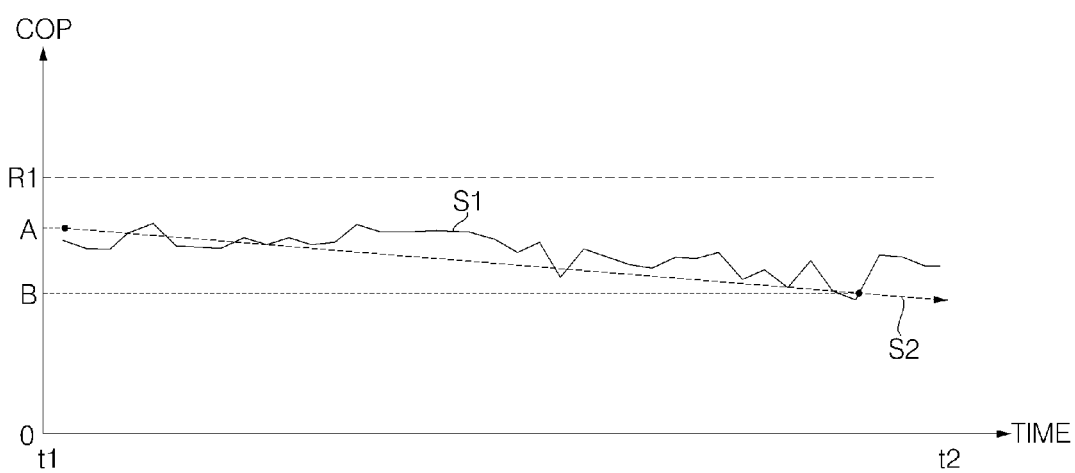
FIG. 5 is an exemplary view referred to in describing a variation in the performance of an air conditioning system according to an embodiment of the present disclosure.

The management server 100 analyzes the data received from the plurality of air conditioners 10, determines the condition of the air conditioners and diagnoses the malfunction thereof. The management server 100 causes the data from the plurality of air conditioners to be collected in the database 90 and manages the data. The management server 100 may include not only a single server but also a plurality of servers which are interconnected to distribute data as shown in FIG. 5.

The management server 100 may be constituted on a per-area basis or on a per-country basis, manage data for air conditioners and analyze operations of the air conditioners.

In addition, the management server 100 may obtain statistical information on a malfunction history, power use, or the like of the air conditioners according to the environment or the facility by analyzing and processing the data of the plurality of air conditioners, and analyze usage patterns of air conditioners operated by a user.

Figure 2:
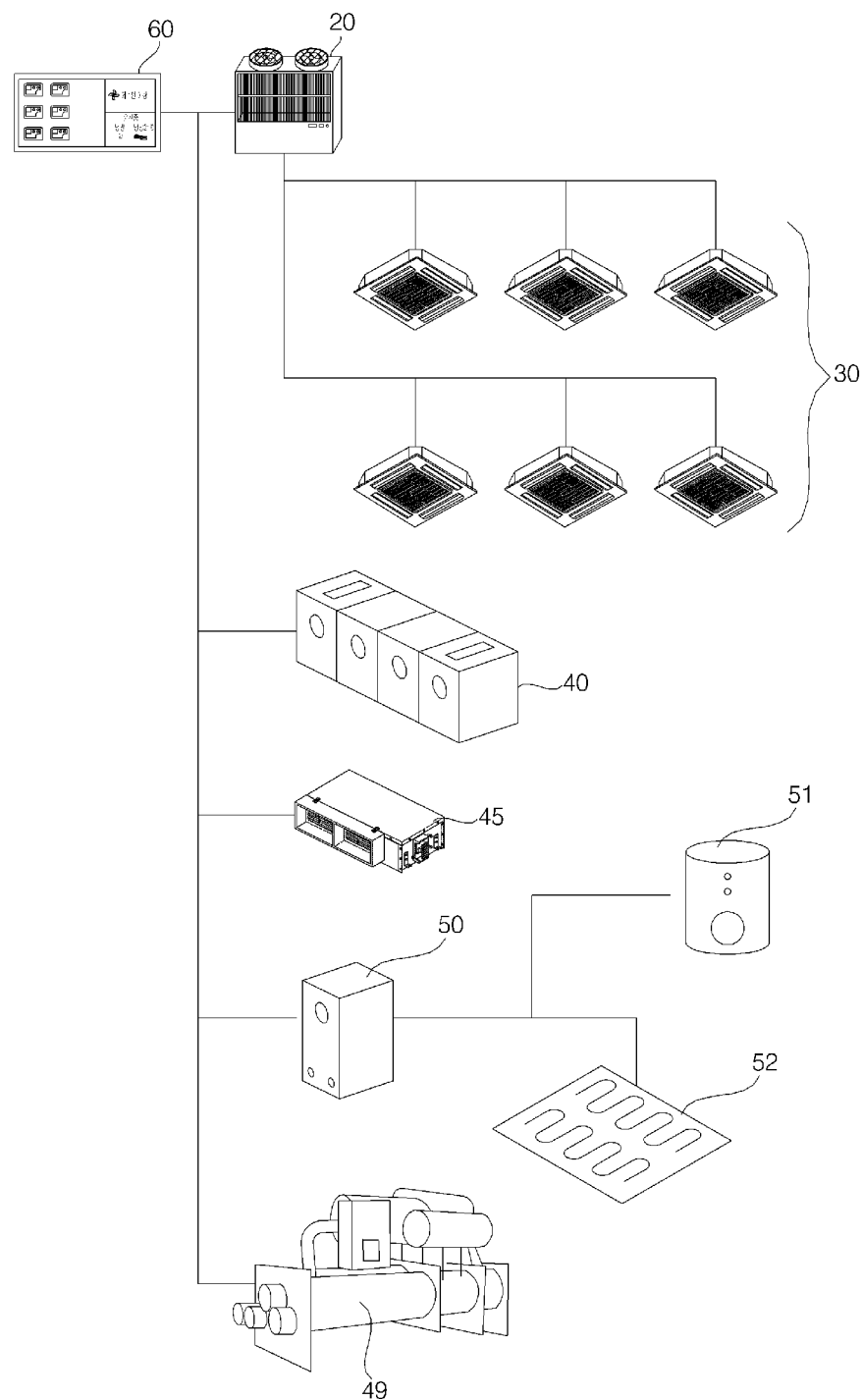
FIG. 2 is a view illustrating a configuration of an air conditioner according to an embodiment of the present disclosure.

FIG. 2 is a view illustrating a configuration of an air conditioner according to an embodiment of the present disclosure.

As illustrated in FIG. 2, the air conditioner 10 includes an indoor unit 30, outdoor unit 20, and a controller 60.

In addition to the indoor unit and the outdoor unit, the air conditioner further includes an air conditioning unit 40, a ventilation unit 45, a total heat exchanger 50, a chiller 49, a water heater 51. The air conditioner may further include an air cleaning unit, a humidifying unit, a dehumidifying unit, and a heater. The air conditioner may be operated in conjunction with the operation of the indoor unit and the outdoor unit, with elements composing the air conditioner interconnected. In addition, the air conditioner 10 may be operated in conjunction with a building, a mobile device, a security device, and an alert device.

The air conditioner may further include a plurality of remote controllers connected to the plurality of indoor units 30, respectively. The remote controller communicates with the indoor unit 30 wirelessly or through a wired connection, transmits the input data to the indoor unit, and displays the operating condition of the air conditioner.

The air conditioner may be divided into a ceiling type, stand type, wall type, etc. depending on an installed type, and the number of indoor units and outdoor units is not limited to the drawings.

The indoor unit 30 and the outdoor unit 20 are connected to each other through a refrigerant pipe, and heat-exchanged air is discharged to a room by the circulation of the refrigerant. In addition, a plurality of units including the indoor unit 30 and the outdoor unit 20 may communicate with each other through a communication line, a power line, or a refrigerant pipe when connected to the refrigerant pipe, or may wirelessly transmit data to or receive data from each other. The plurality of units is configured to operate in accordance with an operation setting inputted by communicating with each other.

The indoor unit 30 includes an expansion valve expanding the refrigerant supplied from the outdoor unit 20, an indoor heat exchanger exchanging the heat of the refrigerant, an indoor unit fan which causes indoor air to be introduced into the indoor heat exchanger and causes the heat-exchanged air to be discharged into the room, a plurality of sensors, and a controller controlling the operation of the indoor unit.

The indoor unit 30 includes an air outlet discharging the heat-exchanged air, and a wind direction adjusting unit opening and closing an air outlet and controlling the direction of discharged air. The indoor unit is configured to cause air to flow into or out of the indoor unit and adjust an air flow rate by controlling the rotation speed of the indoor unit fan. The indoor unit 30 may further include an output unit for displaying the operation state and setting information of the indoor unit and an input unit for inputting the setting data.

The outdoor unit 20 is configured to operate in a cooling or heating mode in response to the request from the indoor unit 30 which is connected to the outdoor unit or the control command of the controller, and supply the refrigerant to the indoor unit. When a plurality of outdoor units is connected, each outdoor unit may be connected to a plurality of indoor units, and the refrigerant can be supplied to a plurality of indoor units through a distributor.

The outdoor unit 20 includes at least one compressor compressing a refrigerant to discharge a high-pressure gas refrigerant, an accumulator separating a gas refrigerant and a liquid refrigerant from the refrigerant and preventing the liquid refrigerant from flowing of an unevaporated liquid refrigerant into the compressor, an oil separator separating oil from the refrigerant discharged from the compressor, an outdoor heat exchanger condensing or evaporating the refrigerant by exchanging heat with outdoor air, an outdoor unit fan introducing air into the outdoor heat exchanger and discharging heat-exchanged air to the outside, in order to facilitate the heat exchange of the outdoor heat exchanger, a four-way valve changing a path of the refrigerant according to an operation mode of the outdoor unit, at least one pressure sensor measuring pressure, at least one temperature sensor measuring temperature, a controller controlling the operation of the outdoor unit and communicating with other units. The outdoor unit 20 further includes a plurality of sensors, valves, supercooling apparatuses, or the like, and the relevant description will be omitted below.

The air conditioning unit 40 is connected to a duct, and configured to circulate air, at the same time, heat or cool the air to supply it to the room, and introduce outdoor air or discharge the indoor air.

The ventilation unit 45 is configured to introduce outdoor air, discharge indoor air, and control the flow of air so that the air is circulated.

The total heat exchanger 50 is connected to the water heater 51 and heats a floor 52 or supplies hot water by recovering waste heat through the heat exchange between air and water and reusing the waste heat.

The controller 60 is connected to the plurality of units, monitors the operations thereof based on information on the plurality of units and controls the operations of the units by individually controlling or grouping the plurality of units. The controller 60 registers information on a plurality of units to be connected, periodically transmits and receives data to update information on the connected units, causes the updated information to be displayed on a display screen, and causes an input control command to be transmitted to a corresponding unit so that its operation is adjusted.

The controller 60 controls the operations of the indoor unit 30 and the outdoor unit 20 in response to an input command by a user, periodically receives data on the operation states of the indoor unit and the outdoor unit corresponding thereto, causes the received data to be stored, and causes the operation states to be displayed on a display screen. The controller is connected to the indoor unit 12, and may perform at least one of an operation setting, lock setting, schedule control, group control, peak control for power use, and demand control for the indoor unit.

Figure 3:
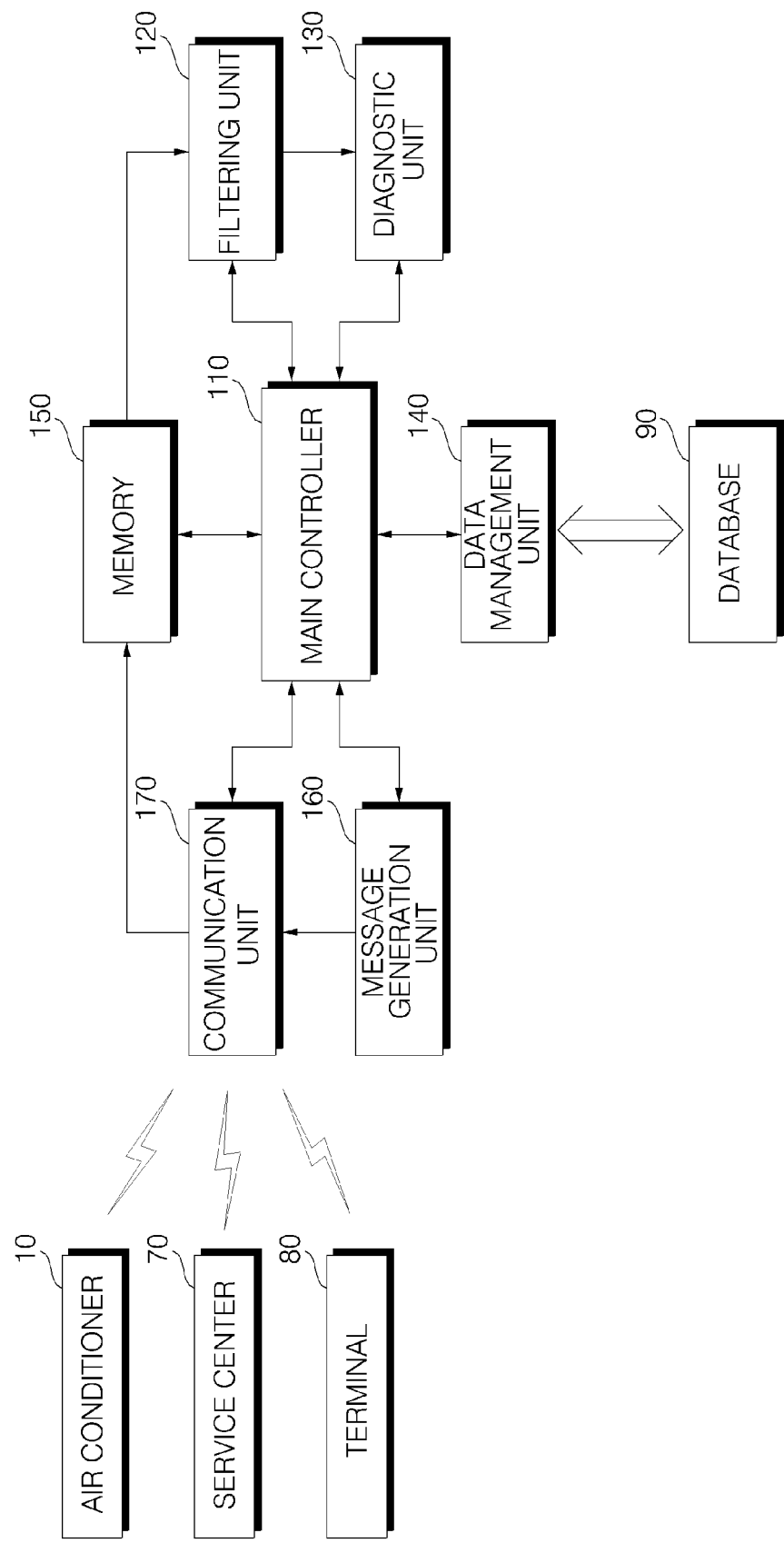
FIG. 3 is a simplified block view illustrating a control configuration of a management server of an air conditioning system according to an embodiment of the present disclosure.

FIG. 3 is a simplified block view illustrating a control configuration of a management server of an air conditioning system according to an embodiment of the present disclosure.

As illustrated in FIG. 3, the management server 100 includes a communication unit 170, a memory, a filtering unit 120, a diagnostic unit 130, a message generation unit 160, a data management unit 140, and a main controller 110 controlling overall operations. At least one diagnosis server may be provided and if the diagnosis server is composed of a plurality of diagnosis servers, a main controller may be provided. Each configuration of the diagnostic servers may be composed and implemented as one or more processors and/or a hardware device.

A memory 150 is provided inside the management server, which stores the data of the management server. The memory stores control data for operation and data processing of the management server, data for a malfunction diagnosis, and data transmitted and received. The memory may be hardware, and various storage devices such as ROM, RAM, EPROM, flash drive, hard drive, or the like.

The memory stores data on the air conditioner received from the communication unit 170, stores diagnostic results by the diagnostic unit 130, and stores the message generated by the message generation unit 160

The memory may temporarily store data on the air conditioner to be stored. The memory may temporarily store data for analysis before the data on the air conditioner is collected in the database. A part of the air conditioning data stored in the memory may be discarded by the filtering unit, and another part or the other part of the data may be used for diagnosis. In response to a diagnosis result of the diagnostic unit, only a part of the remaining data may be collected in the database 90, and the other data may be discarded.

The communication unit 170 is configured to receive data on the air conditioner from the air conditioner 10 through network N. The communication unit 170 is configured to receive data from a plurality of air conditioners 1 to n and cause the data to be stored in a memory.

In addition, the communication unit 170 is connected to the service center 70 and the terminal 80 through a network to transmit and receive data. The communication unit 170 transmits a diagnosis result of the diagnostic unit 130 or a message generated from the message generation unit 160 to at least one of the service center 70, the terminal 80, and the air conditioner 10 according to the control command of the main controller.

The filtering unit 120 is configured to filter data on the air conditioner stored in the memory. The filtering unit 120 is configured to determine whether the data on air conditioner stored or to be stored in the memory is readable. In a case where the data cannot be read, the main controller may request retransmission of the data to the corresponding device in response to the determination result from the filtering unit.

In addition, the filtering unit 120 is configured to determine whether or not the received data is cycle data for diagnosis, and if the received data is not cycle data, the data is collected in the database 90 by filtering.

The diagnostic unit 130 is configured to analyze the data on the air conditioner, especially the cycle data, and perform diagnosis on components or units, an operation state, and the performance for the air conditioner. The diagnostic unit 130 is configured to analyze the data on the air conditioner and determine whether the air conditioner is in a normal state or in an anomalous state.

The diagnostic unit 130 is configured to compare the information included in data of the air conditioner with a reference value to determine whether the air conditioner is in a normal state or in an anomalous state. The data on the air conditioner may be analyzed considering the comparison between the same devices, the examination of the factors depending on the external environment, or the installation environment of the device or system, and thus a malfunction of the air conditioner can be diagnosed.

The diagnostic unit 130 is configured to diagnose whether sensors and components from data on the air conditioner are in a normal state, predict the efficiency and performance of the device or system, determine that the air conditioner is in one of a normal state, an anomalous state or a malfunction state, and generate a diagnosis result.

The anomalous state indicates a state in which the air conditioner has a problem but the air conditioner is in an operable state, a state in which the performance or efficiency is deteriorated or a state in which a malfunction is likely to occur within a certain time although it is presently operating. Meanwhile, the malfunction state is a state in which a fault has already occurred, and operating cannot be performed.

The diagnostic unit 130 is configured to analyze data on the air conditioner and generate a diagnosis result including an anomalous state, the cause of the anomalous state, and a countermeasure for resolving the anomalous state. In addition, the diagnostic unit 130 is configured to analyze data on the air conditioner, distinguish between the anomalous state and the malfunction state, and if the air conditioner is in the malfunction state, generate a diagnosis result including the cause of the malfunction state and a countermeasure for resolving the malfunction state.

The diagnostic unit 130 may be configured to generate a diagnostic result for the performance and efficiency of the air conditioner. The diagnostic unit 130 is configured to analyze the efficiency of the air conditioner corresponding to variations in performance, energy usage, etc., over a period of time and generate a diagnosis result including details of parts that need to be inspected or repaired and a subsequent countermeasure.

In addition, the diagnostic unit is configured to determine whether the performance is deteriorated for a certain period of time, as well as a temporary malfunction or anomalous condition, and generate a diagnostic result for the deterioration. It this case, the diagnostic unit may be configured to perform the diagnosis function by distinguishing a real-time diagnosis from an evaluation of the performance and efficiency.

The diagnostic unit 130 is configured to extract data such as pressure, a flow rate, power and a RPM from data on the air conditioner, and diagnose the performance by calculating a coefficient of performance (COP), freezing capacity, heat balance, and operation efficiency based on the extracted data. The diagnostic unit is configured to accumulate and store data on the energy usage and performance of the air conditioner over a period of time and diagnose the condition of the air conditioner based on variations on the energy usage and performance.

The diagnostic unit 130 is configured to analyze the data on the air conditioner, and calculate the performance and the efficiency of the operation of the air conditioner. The diagnostic unit 130 is configured to analyze the data on the air conditioner in real time and determine the performance of the air conditioner based on energy usage and a plurality of data.

The management server 100 accumulates and stores data on the air conditioner in a state where the air conditioner is in a normal operation state, compares the data with each other by a certain period of time, and determines the deterioration of the efficiency and performance corresponding to variations over a certain period of time.

The management server 100 may diagnose the air conditioner as an anomalous state when the efficiency and performance thereof are predicted to be deteriorated and diagnoses the deterioration of the performance or efficiency with the data accumulated over a certain period of time even though it is determined as a normal state. Even if the current state is normal, if the performance and efficiency are deteriorated for a certain period of time, the management server generates and transmits a diagnosis result.

For example, the management server 100 diagnoses the air conditioner by comparing data of the air conditioner with each other based on the air conditioner's product year, installation location, product model, product structure, product capacity and/or historical data by a certain period, temperature, humidity, weather and/or seasonal information.

The management server 100 derives an average sensor value, an anomalous value, or a device usage pattern, etc. by comparing and analyzing numerical values shown in cycle information of each device from data on the air conditioner, checks a variation trend of sensor values according to external environment by analyzing weather information data such as an external temperature or humidity, etc. in conjunction with the cycle information, derives a cycle operation trend according to an installation environment by comparing the cycle information with an actual installation environment, and thus diagnoses the air conditioner.

The air conditioner 10 transmits, to the management server 100, data on the air conditioner including a plurality of pieces of information generated or measured during operation, for example, measured values of temperature sensors such as a room temperature, outdoor temperature, and refrigerant temperature, etc., measured values of pressure sensors such as a compressor pressure and pipe pressure, etc., the operation of a valve, voltage or current values consumed by the valve, information on whether or not a valve, compressor, fan motor, heat exchanger is in an anomalous state, the contamination of a heat exchanger, information on whether a quantity of a refrigerant is insufficient, information on efficiency and performance, or the like.

When determines whether the air conditioner is in an anomalous state, the diagnostic unit, although it is in a normal state, may be configured to check the air conditioner before a malfunction occurs and generate a diagnostic result to eliminate a malfunction or an anomalous condition.

The message generation unit 160 is configured to generate a message corresponding to a diagnosis result and transmit it to the air conditioner 10 or the terminal 80. In this case, the message is generated in a form readable by the air conditioner or terminal. In case of transmitting to the terminal, the message may be composed of a mobile web page as well as a short message or a multimedia message.

In a case where it is determined that the air conditioner is in an anomalous state or a malfunction state, the message generation unit may be configured to transmit a diagnostic result for the air conditioner to the air conditioner or the terminal through the communication unit and transmit the diagnosis result and a malfunction history to the service center. The message generation unit may be configured to generate and transmit a text-based error notification, or a GUI based diagnosis result report so that a user can check the diagnosis result.

The main controller 110 causes the communication unit to transmit or receive data, and controls the data input or output of a memory.

The main controller 110 may receive and store data 200 from a plurality of air conditioners installed in a wide area or a country via the network N, and extract data necessary for diagnosis, and temporarily store the extracted data in the memory. In addition, after diagnosis on the malfunction of the air conditioner is performed by the diagnostic unit, the main controller causes the data on the air conditioner to be collected in database 90.

The main controller 110 causes the diagnosed data on the air conditioner to be collected in the database as described above and deletes the data from the memory to store new data.

The data management unit 140 is configured to manage data collected in the database 90 according to a control command of the main controller. The data management unit 140 is configured to cause the data to be collected in the database, read the collected data, and send the data to the main controller. The data management unit 140 may be connected to the database through the communication unit according to the connection status of the management server and the database.

In addition, the data management unit is configured to cause data on the number of times, such as a first number, a second number, or the like to be stored separately, and cause the number of times for a short term, for example the first number, and the number of times for a long term, for example the second number, to be stored separately.

In addition, the main controller 110 transmits a diagnosis result to the service center through the communication unit 170 when it is determined that it is necessary to dispatch a service engineer, in case of the deterioration of the performance or efficiency, in a state where it is determined that the air conditioner is in an anomalous state or a malfunction state, and therefore, a service reservation in the service center can be performed.

In addition, the main controller 110 causes the message generated by the message generation unit to be transmitted through the communication unit 170.

Meanwhile, the management server may be constituted as a single server, or a plurality of servers by which data can be distributed and processed. The management server 100 may include a diagnostic server, a data server, a main server, and a distributed management server depending on functions. The management server may be constituted such that each server is not separately operated from other servers but connected to other servers so that a plurality of servers is interconnected to distribute and process the data.

The diagnosis server analyzes and filters data on the air conditioner stored in the memory, analyzes data on the air conditioner, diagnoses an anomalous state or malfunction state of the air conditioner, and generates a corresponding countermeasure. The diagnostic server may compare data on an air conditioner of data from the air conditioners with data of the same air conditioner, compare with the past data of the air conditioner, and diagnose the air conditioner based on data on an external environment or installation environment. The data server causes the data to be collected in the connected database 90 and reads specific data from the database and transmits according to a request. The data server causes the data on the air conditioner to be stored based on a result diagnosed as an anomalous state or a malfunction state, or a result performed diagnosis. The main server controls a data transmission and reception of the management server and a data input and output. In a case where the management server is composed of a plurality of servers to process data, the distributed management server allocates data to each server to distribute and process the flow of each data and data on the air conditioner. In addition, in a case where the diagnosis server is composed of a plurality of servers, the distributed management server allocates data on the air conditioner to each diagnosis server so that each of them operates.

Figure 4:
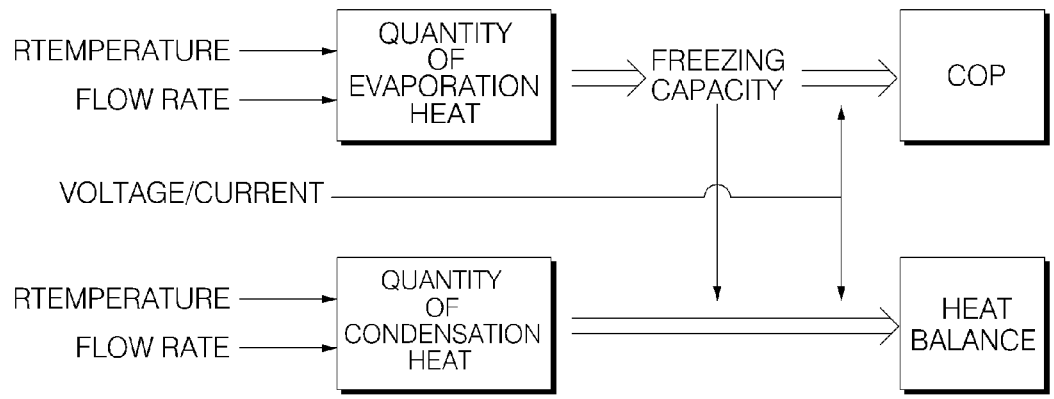
FIG. 4 is a view referred to in describing a method for evaluating the performance and efficiency of an air conditioner according to an embodiment of the present disclosure.

FIG. 4 is a view referred to in describing a method for evaluating the performance and efficiency of an air conditioner according to an embodiment of the present disclosure.

As illustrated in FIG. 4, the management server 100 receives and stores the data of the air conditioner 10, analyzes data on the air conditioner, and calculates a COP and a thermal balance (heat balance). A factor used in this case may be varied according to an index to be determined.

The COP (Coefficient of Performance) is a coefficient of performance of a refrigerator and is an index for evaluating the power energy used in a refrigerator or heat pump system and can be used to determine efficiency The diagnostic unit is configured to calculate a quantity of the evaporation heat of the air conditioner based on temperature and flow rate. In this case, information on the density of cold water can be used together with in case of a water-cooled type, for example, a chiller. The diagnostic unit is configured to calculate the freezing capacity of the air conditioner from the quantity of the evaporation heat. That is, the freezing capacity of the air conditioner for a cooling operation is calculated. The diagnostic unit is configured to calculate the COP based on the calculated freezing capacity and a voltage or current value.

In addition, the diagnostic unit is configured to calculate the quantity of condensation heat of the air conditioner based on temperature and flow rate. In this case, information on the density of cold water can be used together with in case of a water-cooled type. The diagnostic unit is configured to calculate a thermal balance (heat balance) using the freezing capacity and a voltage or current value described above, as well as the quantity of the condensation heat.

The diagnostic unit is configured to determine the performance and efficiency of the air conditioner based on the calculated COP and thermal balance on the air conditioner.

The diagnostic unit 130 is configured to store data on the COP and thermal equilibrium for a certain period of time, analyze variations of the data, compare the analyzed data or the variations of the stored data with the variations of energy usage, or, in a state where the energy usage is included in the analyzed data or the stored data, the analyzed data or the stored data with each other, and thus, diagnose the performance and efficiency of the air conditioner.

FIG. 5 is an exemplary view referred to in describing a variation in the performance of an air conditioning system according to an embodiment of the present disclosure.

As illustrated in FIG. 5, a variation in efficiency can be determined by accumulating the COPs calculated for a predetermined period for the air conditioner.

In a case where the COPs from a first time t1 to a second time t2 are accumulated, it is observed that there are variations of the COPs, but the COPs from the first time to the second time are decreased.

A value corresponding to a predetermined ratio, for example, 70% of the rated COP (R1), can be set as a first reference value B, wherein R1 is the rated COP of a product. In this case, the first reference value may vary according to the rated COP and the ratio of a product.

If the COP is lower than the first reference value (B) which is 70% of the rated COP of a product, the diagnostic unit may determine that the performance of the product is in an anomalous state.

At the first time t1, the COP is lower than R1, which is the rated COP of the product, but the value is higher than the first reference value (B). Therefore, the diagnostic unit determines that the product is in a normal state.

When the time has elapsed from the first time t1 to the second time t2, the COP becomes lower than the first reference value B which is defined as the reference. In this case, the diagnostic unit may determine that the performance is deteriorated because the COP decreases from the first time to the second time, but it is determined that the product is in a normal state because the COP is higher than the first reference value (B).

However, at the second time t2, even if the value of the COP is lower than the first reference value B and the value temporarily increases, the diagnostic unit may determine that the product is in an anomalous state because the COP is decreasing from the first time to the second time.

Figure 6:
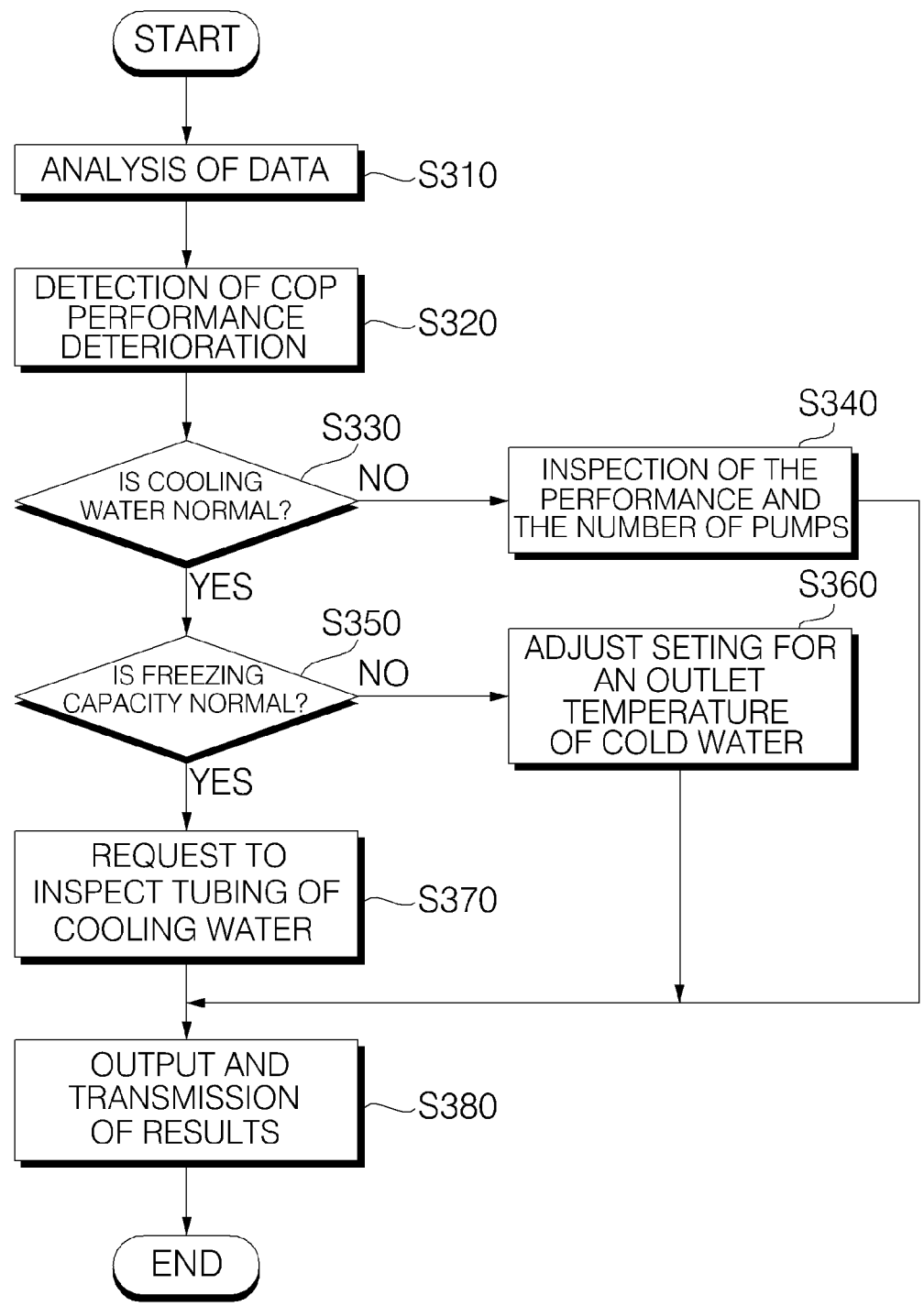
FIG. 6 is a view illustrating a control method based on the performance diagnosis of the air conditioning system of FIG. 5.

FIG. 6 is a view illustrating a control method based on the performance diagnosis of the air conditioning system of FIG. 5.

As illustrated in FIG. 6, the management server 100 receives and stores the data of the air conditioner 10, analyzes data on the air conditioner in real time, and diagnoses an operation state of the air conditioner as one of a normal state, an anomalous state and a malfunction state.

In addition, the management server analyzes the received data (S310) and calculates the COP of the air conditioner. The COP can be calculated using a voltage and/or current value, taken alone or in conjunction with, the freezing capacity calculated based on temperature, flow rate, and the density of water, as described above.

The management server detects the performance deterioration based on the COP value (S320). The management server may determine the performance deterioration based on the first reference value (B) that corresponds to a certain ratio of the COP value to the rated COP of the air conditioner.

If it is determined that the performance based on the COP is deteriorated, the diagnostic unit analyzes the cause of the performance deterioration.

In response to the performance deterioration based on the COP, the diagnostic unit determines whether a quantity of cold water supplied to the air conditioner is normal (S330). It is determined that the quantity of cold water is anomalous, the diagnostic unit derives a countermeasure for the performance of a pump used to supply cold water and the number of pumps being operated to be inspected (S340).

Meanwhile, if the quantity of cold water is normal, the diagnostic unit determines whether the freezing capacity is normal (S350).

The freezing capacity may be calculated based on the temperature and the flow rate and the density of the supplied water as described above.

In a case where it is determined that the freezing capacity is in an anomalous state, the diagnostic unit derives a countermeasure for a setting of an outlet temperature of cold water to be adjusted (S360).

Meanwhile, in a case where the freezing capacity is normal, it can be determined that the performance deterioration is not resulted from the quantity of cold water and the freezing capacity, and then a countermeasure for tubing to be inspected may be derived (S370). If the tubing gets narrowed due to foreign substances, that may cause deterioration of performance, and therefore, a countermeasure for the tubing to be inspected may be derived.

The diagnostic unit may generate a diagnostic result including the deterioration of performance based on the COP, a cause thereof and a resulting countermeasure. The management server stores the diagnosis result and transmits the diagnosis result to the controller of the air conditioner (S380). The management server stores the diagnosis result and transmits the diagnosis result to the controller of the air conditioner (S380).

Accordingly, the controller may output the diagnosis result so that a user can perform self-checking and may request inspection and repair by accessing to the service center 70. If repair is required, a service request may be performed from the management server.

Figure 7:
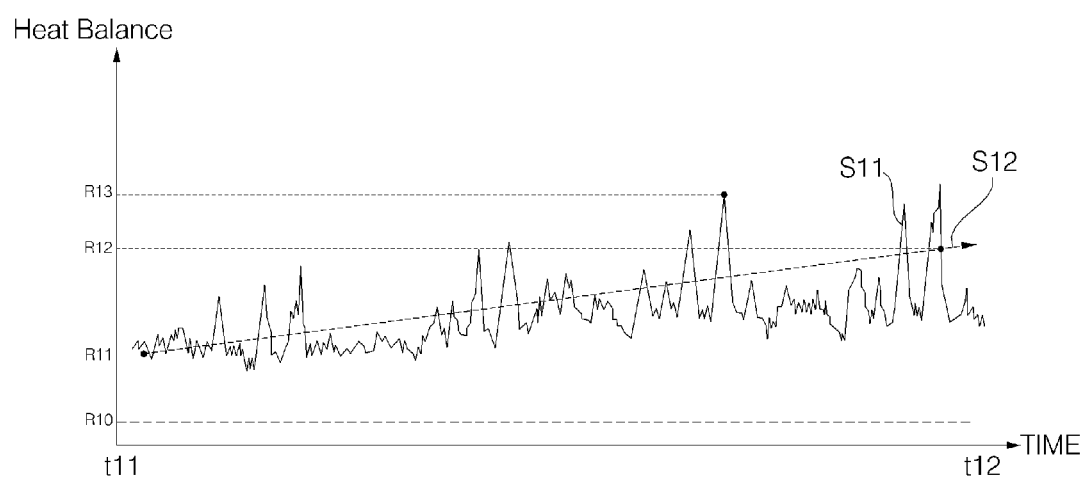
FIG. 7 is an exemplary view referred to in describing variations in the performance of an air conditioning system according to another embodiment of the present disclosure.

FIG. 7 is a view referred to in describing variations in the performance of an air conditioning system according to another embodiment of the present disclosure.

As illustrated in FIG. 7, the management server 100 may analyze data on the air conditioner, calculate a heat balance value, accumulate the calculated heat balance values for a certain period of time, determine a variation of the accumulated data, and thus determine the performance on the air conditioner.

It is observed that heat balance values get increased with variation of the heat balance values from an eleventh time t11 to a twelfth time t12.

The diagnostic unit may diagnose the performance of the air conditioner based on heat balance values by using a plurality of reference values.

The diagnostic unit sets a second reference value R10 for determining the normal range for the heat balance and determines the performance of the air conditioner and whether it is in a normal state based on measured values.

The diagnostic unit calculates a quantity of condensation heat based on the temperature and the flow rate and the density of the supplied water, determines a quantity of evaporation heat based on the temperature, the flow rate and the density of the supplied water, calculates a freezing capacity, and thus calculates a heat balance value of the air conditioner based on the freezing capacity, the quantity of the condensation heat, and a voltage or current value, as described above.

The diagnostic unit determines that the heat balance is in a normal state if a heat balance value falls in the range of zero to the second reference value R10 and determines that it is in an anomalous state if the heat balance value is higher than the second reference value.

Since a heat balance value at the eleventh time t11 is R11 exceeding the second reference value, the diagnostic unit determines that the air conditioner or the heat balance is in an anomalous state. Since this situation may occur temporarily, the diagnostic unit may finally determine the anomalous state of the air conditioner with the degree to which the heat balance value has varied over a certain period.

The diagnostic unit may determine that the performance of the air conditioner has deteriorated as a heat balance value continuously increases until reaching the 12th time with the lapse of time, in a state where the heat balance value has exceeded the second reference value (S12).

Before reaching the 12th time, the value can temporarily increase to reach R12 and R13 (S11), but since it continuously increases, an anomalous state of the air conditioner may be determined based on the increasing trend.

The diagnostic unit may determine that a problem is given in the performance of the cooling water system in a case where a heat balance value exceeds the second reference value and continuously increases.

Thus, the diagnostic unit may derive a countermeasure for cooling water to be inspected.

Figure 8:
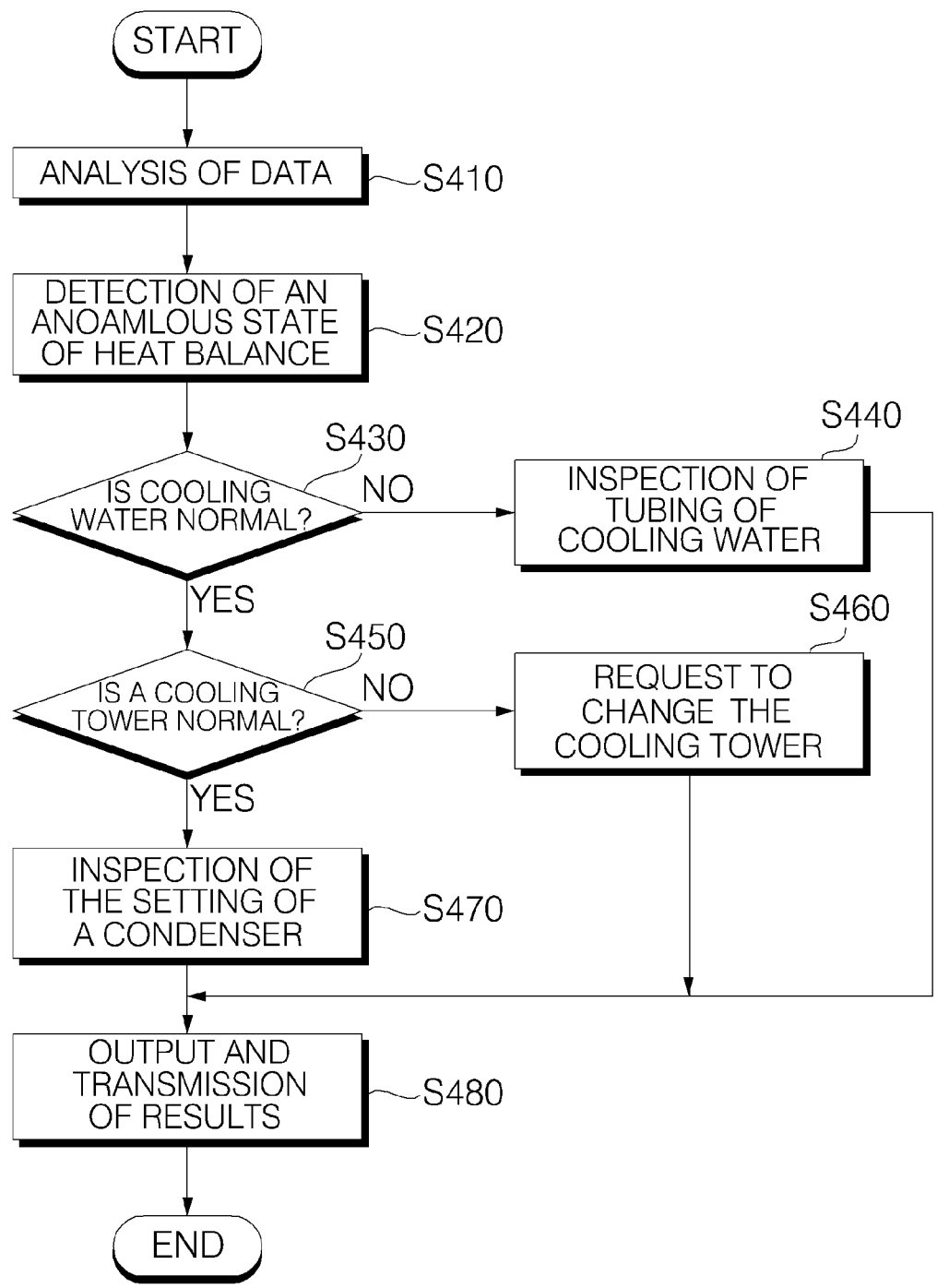
FIG. 8 is a view illustrating a control method based on the performance diagnosis of the air conditioning system of FIG. 7.

FIG. 8 is a view illustrating a control method based on the performance diagnosis of the air conditioning system of FIG. 7.

As illustrated in FIG. 8, the management server 100 receives and stores the data of the air conditioner 10, analyzes data on the air conditioner in real time, and diagnoses an operation state of the air conditioner.

In addition, the management server analyzes the received data (S410) and calculates a heat balance value of the air conditioner.

The management server detects the performance deterioration based on the calculated heat balance value (S420). The management server may determine whether the heat balance is normal by comparing the heat balance value with a second reference value (R10). The smaller the heat balance value, the better the performance of the air conditioner.

The diagnostic unit may determine that the heat balance is anomalous if a heat balance value is higher than the second reference value. However, the diagnostic unit may check the variation of the heat balance values with the cumulative data of the heat balance values for a certain period to determine whether the heat balance is normal or not. It is determined that the heat balance is anomalous if a heat balance value is greater than the second reference value, and the performance and state of the air conditioner may be diagnosed by determining whether the anomalous state is maintained for a predetermined period.

If it is determined that the heat balance is anomalous, the diagnostic unit determines whether cooling water is normal (S430). If it is determined that the cooling water is anomalous, since the anomalous heat balance can be resulted from cooling water, the diagnostic unit may derive a countermeasure (S440) for the tubing of cooling water to be inspected. Whether the cooling water is anomalous or not may be determined based on the temperature and the flow rate of the cooling water.

Meanwhile, if cooling water is normal, the diagnostic unit determines whether a cooling tower is normal (S450). Whether the cooling tower is anomalous or not can be determined based on the temperature and the flow rate of the cooling tower. If it is determined that the cooling tower is anomalous, the diagnostic unit determines that the anomalous heat balance is resulted from a cooling tower and derives a countermeasure for the cooling tower to be replaced (460).

Meanwhile, if it is determined that the cooling water and the cooling tower are normal, the diagnostic unit determines that the anomalous heat balance is resulted from a condenser and derives a countermeasure for a state of the condenser to be inspected (S470).

The diagnostic unit may determine whether an anomalous state is occurred or not based on another cause even if a countermeasure for one cause can be derived. That is, the diagnostic unit may further check whether the cooling tower is normal even if a countermeasure is derived against the anomalous cooling water.

The diagnostic unit may determine at least one cause with respect to performance deterioration of the air conditioner and derives a countermeasure against the at least one cause.

The diagnostic unit generates a diagnostic result that includes the performance deterioration and an anomalous factor or object, those causes and a corresponding countermeasure.

The management server stores and outputs the generated diagnosis result and transmits it to the controller (S480). According to a request, the diagnosis result can be transmitted to the terminal having the control authority for the air conditioner.

Figure 9:
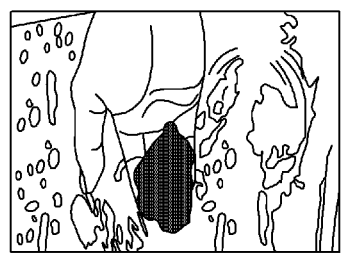
FIG. 9 is an exemplary view referred to in describing the phenomenon caused by an anomalous operating condition of an air conditioning system according to an embodiment of the present disclosure.
Figure 9:
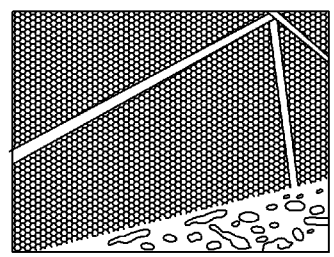
Figure 9:
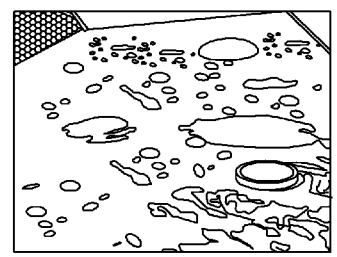

FIG. 9 is a view referred to in describing the phenomenon caused by an anomalous operating condition of an air conditioning system according to an embodiment of the present disclosure.

As illustrated in FIG. 9 (a), in a case where cooling water is contaminated or foreign substances are included, since the density of the cooling water varies and a problem occurs in the flow of the cooling water due to the foreign matter, therefore it is not easy to control the temperature and flow rate of the cooling water. As a result, a quantity of the evaporation heat of the air conditioner is reduced, which deteriorates the freezing capacity and results in an anomalous COP and/or heat balance.

Therefore, in a case where a COP value decreases, the management server may determine that it is resulted from cooling water.

In addition, as illustrated in FIG. 9 (b), in a case where a filling substance is contaminated, heat exchange is not normally performed, and therefore, a quantity of evaporation heat and of condensation heat decreases, which may result in an anomalous COP and/or heat balance.

As illustrated in FIG. 9 (c), in a case where cooling water is contaminated, bubbles are generated in the cooling water, which causes the heat exchanger to be contaminated. In a case where the heat exchanger is contaminated, the heat exchange is not normally performed as described above, and therefore, a quantity of evaporation heat and of condensation heat decreases, which may result in an anomalous COP and/or heat balance.

In addition, when the quantity of cooling water is insufficient, the heat exchange is not normally performed, which may result in an anomalous COP and heat balance.

Therefore, according to the present disclosure, the management server diagnoses the condition of the air conditioner in real time, calculates the COP and the heat balance for the air conditioner, determines whether the COP and/or the heat balance are anomalous based on variations of the values of calculated COP and/or heat balance for a predetermined period. Thus, according to the present disclosure, the performance and efficiency of the air conditioner can be evaluated, and an occurred problem can be solved based on a diagnosis result on the performance deterioration.

Even though all the elements that make up the embodiment of the present disclosure are described as combined into a single group, the present disclosure is not necessarily limited to this embodiment. Within the scope of the present disclosure, all components may be combined into in multiple groups depending on embodiments.

As the foregoing description of the present disclosure has been provided with reference to preferred embodiments of the present disclosure, those skilled in the art will appreciate that various modifications and variations may be made to the present disclosure without departing from the spirit and scope of the present disclosure set forth in the claims that follow.

What is claimed is:

1. An air conditioning system comprising:
    at least one air conditioner;
    a management server configured to analyze data relating to the air conditioner received from the air conditioner at a predetermined time interval and to diagnose an operation state of the air conditioner; and
    a database configured to collect the data relating to the air conditioner, wherein the management server includes:
    a memory to store the data relating to the air conditioner,
    a communication unit configured to receive the data relating to the air conditioner;
    a main controller configured to store the data relating to the air conditioner in the memory; and
    a diagnostic unit, the diagnostic unit being a processor,
    wherein, when the data relating to the air conditioner is received from the air conditioner, the diagnostic unit is configured to:
    analyze the data relating to the air conditioner;
    determine an operation state of the air conditioner in real time;
    calculate a coefficient of performance (COP) and a heat balance of the air conditioner for a predetermined period based on the data relating to the air conditioner accumulated during the predetermined period;
    calculate the data on performance and efficiency of the air conditioner to determine performance deterioration of the air conditioner based on at least one of the calculated COP and heat balance; and
    derive a countermeasure based on the determined operation state of the air conditioner,
    wherein the diagnostic unit is configured to determine that the performance deterioration of the air conditioner is related to at least one of a quantity of cold water supplied to the air conditioner, freezing capacity of the air conditioner, and tubing of cold water of the air conditioner based on the calculated COP, and
    wherein, when the diagnostic unit determines that the quantity of cold water and the freezing capacity are normal, the diagnostic unit derives the counter measure of causing the tubing of cold water of the air conditioner to be inspected.

2. The air conditioning system according to claim 1, wherein the diagnostic unit
    determines one of a normal state, an anomalous state and a malfunction state of the air conditioner as the operation state from the data relating to the air conditioner.

3. The air conditioning system according to claim 1, wherein the diagnostic unit is configured to set a first reference value corresponding to a predetermined ratio based on rating data of the COP for the air conditioner, and
    wherein, when the calculated COP is less than the first reference value, the diagnostic unit determines that the air conditioner is in the anomalous state.

4. The air conditioning system according to claim 1, wherein, when the diagnostic unit determines that the quantity of cold water is anomalous, the diagnostic unit derives the counter measure of performing an inspection of a pump supplying cold water to the air conditioner.

5. The air conditioning system according to claim 1, wherein, when the diagnostic unit determines that the freezing capacity is anomalous, the diagnostic unit derives the counter measure of adjusting a setting of an outlet temperature of cold water being supplied to the air conditioner.

6. The air conditioning system according to claim 1, wherein the diagnostic unit is configured to set a second reference value to determine whether the calculated heat balance is normal, and
    wherein, when the calculated heat balance value is greater than or equal to the second reference value, the diagnostic unit determines that the air conditioner is in the anomalous state.

7. The air conditioning system according to claim 6, wherein the diagnostic unit is configured to accumulate calculated heat balance values for the predetermined period, and
    wherein, when the accumulated calculated heat balance values steadily increase while the air conditioner is in the anomalous state, the diagnostic unit is configured to determine that the performance of the air conditioner is deteriorated.

8. The air conditioning system according to claim 6, wherein, in response to the performance deterioration of the air conditioner based on the calculated heat balance, the diagnostic unit is configured to determine that the performance deterioration is related to at least one of cooling water supplied to the air conditioner, a cooling tower and a condenser of the air conditioner.

9. The air conditioning system according to claim 8, wherein, when the diagnostic unit determines that the cooling water is anomalous, the diagnostic unit derives the counter measure of performing inspection of tubing of cold water of the air conditioner, and
    wherein, when the diagnostic unit determines that the cooling tower is anomalous, the diagnostic unit derives the counter measure of changing the cooling tower.

10. The air conditioning system according to claim 9, wherein, when the diagnostic unit determines that the cooling water and the cooling tower are normal and that the condenser is anomalous, the diagnostic unit derives the counter measure of causing an inspection of a setting of the condenser.

11. A control method of an air conditioning system, the method comprising:
    receiving data, by a server, related to at least one air conditioner in the air conditioning system;
    storing the data in a memory;
    determining, by a processor of a diagnostic unit, an operation state of the air conditioner in real time;
    calculating, by the server, data on performance and efficiency of the air conditioner based on the received data;
    accumulating the data on the performance and efficiency for a predetermined period and storing the accumulated data in the memory;
    calculating, by the processor of the diagnostic unit, a coefficient of performance (COP) and a heat balance based on the data on the performance and efficiency of the air conditioner by analyzing the data relating to the air conditioner;
    diagnosing, by the processor of the diagnostic unit, performance deterioration of the air conditioner by analyzing a variation of the data on the performance and efficiency;
    when the performance deterioration of the air conditioner is determined based on the calculated COP, determining that the performance deterioration is related to at least one of a quantity of cold water supplied to the air conditioner, freezing capacity of the air conditioner, and tubing of cold water of the air conditioner, by processor of a diagnostic unit generating, by the processor of a diagnostic unit, a diagnostic result based on the performance deterioration of the air conditioner; and performing a countermeasure based on the diagnostic result to adjust a parameter of the air conditioning system, wherein, when it is determined that the quantity of cold water and the freezing capacity are normal, the countermeasure is inspecting the tubing of cold water of the air conditioner.

12. The control method according to claim 11, further comprising setting a first reference value corresponding to a predetermined ratio based on rating data of the COP of the air conditioner, wherein, when the calculated COP is less than the first reference value, the generated diagnostic result indicates that the performance of the air conditioner is deteriorated.

13. The control method according to claim 11, wherein, when it is determined that the quantity of cold water is anomalous, the countermeasure is performance of an inspection of a pump supplying cold water to the air conditioner, and wherein, when it is determined that the freezing capacity is anomalous, the countermeasure is adjusting a setting for an outlet temperature of cold water being supplied to the air conditioner.

14. The control method according to claim 11, further comprising setting a second reference value to determine whether the calculated heat balance is normal, wherein, when the calculated heat balance value is greater than or equal to the second reference value, determining that the air conditioner is in an anomalous state.

15. The control method of claim 14, further comprising, when the accumulated calculated heat balance values steadily increase while in the anomalous state, determining that the performance of the air conditioner is deteriorated.

16. The control method of claim 15, further comprising, in response to the performance deterioration of the air conditioner based on the accumulated calculated heat balances, determining that the performance deterioration is related to at least one of cooling water supplied to the air conditioner, a cooling tower and a condenser of the air conditioner.

17. The control method of claim 16, wherein, when it is determined that the cooling water is anomalous, the countermeasure is inspecting tubing of cold water supplied to the air conditioner, wherein, when it is determined that the cooling tower is anomalous, the countermeasure is changing the cooling tower, and wherein, when it is determined that the cooling water and the cooling tower are normal, the countermeasure is inspecting the condenser of the air conditioner.

* * * * *